Sept. 29, 1970   G. R. SPENCER   3,531,674
CATHODE RAY TUBE WITH COOLING MEANS FOR THE FLUORESCENT SCREEN
Filed July 5, 1968

INVENTOR
GORDON R. SPENCER
BY
AGENT

United States Patent Office
3,531,674
Patented Sept. 29, 1970

3,531,674
CATHODE RAY TUBE WITH COOLING MEANS FOR THE FLUORESCENT SCREEN
Gordon R. Spencer, Westwood, Mass., assignor to Raytheon Company, Lexington, Mass., a corporation of Delaware
Filed July 5, 1968, Ser. No. 742,874
Int. Cl. H01j 7/26
U.S. Cl. 313—44          2 Claims

ABSTRACT OF THE DISCLOSURE

A cathode ray tube having an optically transparent faceplate of high thermal conductivity material such as sapphire and means for cooling the faceplate whereby the operating temperatures of the faceplate and consequently of luminescent phosphor on the inner side thereof are reduced to a level where the phosphor retains efficient brightness capability when subjected to intense electron bombardment and is less susceptible to deterioration from heating effects.

BACKGROUND OF THE INVENTION

This invention relates to cathode ray tubes used as picture tubes, flying spot scanners or oscilloscopes, and particularly to tubes capable of being used in projection systems. In such tubes, the characteristic problems associated with the desire to obtain very high brightness levels from the phosphor screen relates to the overheating of the phosphor screen as a result of electron bombardment and the resultant loss in luminous efficiency of the phosphor and longevity of that phosphor at high temperatures. For example, if it is desired to obtain a 4 ft. x 4 ft. size display with 10 foot-lamberts brightness, a conventional cathode ray tube would have to be operated at between 40 kv. and 80 kv. and at current levels of between 1 and 2 milliamperes. The power which will be dissipated will, therefore, be between 40 and 160 watts, and much of this power is generated within the vacuum envelope at the phosphor screen. The resulting high temperatures cause the phosphor to "burn" and to operate at low conversion efficiency, electron beam power to luminous power. In conventional high brightness kinescope applications, the phosphor is deposited on a thick glass faceplate, and cooling is attempted by blowing air on the surface of that face plate opposite to that on which the phosphor has been deposited. The poor thermal conductivity of the faceplate makes effective cooling impossible.

Under low intensity excitation of a phosphor by an electron beam, the phosphor brightness is a linear function of current density. Under high intensity bombardment, on the other hand, linearity is no longer achieved and it becomes increasingly difficult to obtain good conversion efficiency from electron beam power to luminous power. This loss in efficiency with increasing intensity of excitation is termed "saturation." Saturation is known to be caused to a great degree by the decreased efficiency of the color centers associated with increased temperature caused by the high power density of electron beam impingement, and by approaching saturation in the limited density of color centers by the very high density of electrons available for exciting the centers. It has been recognized that by cooling of phosphor sceens the efficiency of luminescent phosphors may be preserved to a large degree under intense electron bombardment, this being achieved by chilling the phosphor to an exent where its temperature will not be excessively high under the most intense electron bombardment encountered.

Whenever a small phosphor display with substantial optical magnification is used such that the phosphor must be very bright, this phenomenon of diminishing phosphor efficiency with increasing power input to the phosphor is encountered. In television projection systems, this reduction in efficiency can be great enough to result in reversal of the image; that is, areas of the phosphor which are bombarded by very high density electron beams may be less bright than other areas of the phosphor which are less intensely bombarded.

The basic objective, therefore, of the present invention is the construction of an electro-optical system which will produce a large picture with adequate brightness, contrast, resolution and number of gray shades in the final display while having the minimum practicable size.

In the piror art, we find that conventional type cathode ray tubes have been made with glass faceplates or quartz faceplates. The thickness of glass or quartz used is determined by the structural requirements for withstanding atmospheric pressure. The relatively poor thermal conductivity of glass or quartz, combined with the thickness of the materials required in such tubes, has made it impractical to cool the phosphor itself to desired levels even when the external surface of the glass or quartz has been cooled by conventional techniques such as blowing air across the surfaces.

In the prior art, we find that cathode ray tubes having glass faceplates have been made with dual face panels, the space between the parallel panels being used for the passage of fluid cooant. Exceptionally clear water or other fluid is required in this application, and the fluid must be free of bubbles. Further, variations in refractive index caused by variations in temperature of the fluid will cause image degradation unless careful and specific steps are taken to avoid this effect. The fragility of glass and its relatively poor heat conductivity and tendency to discolor also make this form of tube less desirable.

Greater efficiency in a cathode ray tube of the character described is achieved by employing a metal faceplate which may be chilled in various manners. Applicant has found that degradation in phosphor efficiency under high intensity electron excitation is caused primarily by the increase in instantaneous temperature of the phosphor crystals rather than by saturation of the color emitting centers. Brightness in excess of 50,000 foot-lamberts has been obtained by bombarding a chilled phosphor of a conventional composition with a very intense electron beam, and at bombarding energies of less than 50,000 volts. The principle employed here is to chill the substrate to a temperature such that the heat caused by high intensity elecron bombardment of the phosphor raises the phosphor temperature to a value which is still within the range wherein the cathodo-luminescence is high. This requires some kind of cooling system for the phosphor screen.

A tube employing a metal base plate or faceplate necessarily requires the kind of geometry which enables the phosphor to be viewed from the bombarded side. This requires that the electron gun be angled with respect to the perpendicular to the phosphor screen or, alternatively, that the viewing window be angled with respect to the screen. Certain complications are inherent in both forms. Since it is extremely important to obtain high efficiency of the optical system, that is, minimum light loss, it follows that the viewing window should be situated so as to accept as large a fraction of the total light emitted from the phosphor as possible. It is, therefore, preferable that the electron gun be situated at an angle other than perpendicular to the phosphor surface. In such a tube and system, the deflection means is necessarily oriented at the same angle relative to the phosphor surface and, therefore, a certain degree of trapezoidal distortion in the scanning pattern will result unless correction is made in the scanning system.

However, it has been found that an angled-neck tube of this character having a metal base plate, whose thermal conductivity is naturally much higher than that of glass, is less desirable than a structure according to the present invention. The only reason for using a metal faceplate as the phosphor substrate is to take advantage of its high thermal conductivity. As pointed out above, a metal faceplate, because it is optically opaque, is disadvantageous in that it requires that the electron beam bombard the phosphor on the same side as that from which the useful light is emitted. This creates complications in tube configuration which unfortunately degrades the electron-optical performance. In such an angled-neck tube, the electron beam must impinge on the phosphor at a large angle to the normal, creating an elliptical spot unfavorable for resolution in one dimension. Furthermore, the angled-neck design requires correction for scanning non-linearity and trapezoidal raster distortions. In this internal-mirror design, the electron gun must be located at a longer than usual distance from the phosphor screen, entailing an unusually long emission distance, which means that the electron-optical magnification, and thereby the spot size, is larger than desired.

SUMMARY OF THE INVENTION

The above and other disadvantages of the prior art have been overcome by the present invention wherein there is employed an optically transparent faceplate having high thermal conductivity. Such a faceplate may be constructed of sapphire which has a thermal conductivity at room temperature considerably higher than glass or quartz. The transparency and other optical properties of sapphire are favorable for use in a projection type cathode ray tube, and sapphire can be suitably sealed to metal for use in a vacuumized enclosure.

In accordance with the present invention, there is provided a flat disc of sapphire having on its inner surface a layer of phosphor, which disc is sealed throughout its periphery to a metal-walled conduit which, in turn, is sealed through means having desirable thermal expansion characteristics to one end of a glass envelope. Sapphire has such efficient thermal conductivity that the temperature of a faceplate of this character may be suitably lowered during tube operation by merely subjecting the peripheral edge of the sapphire disc to coolant flow. Alternatively, the sapphire may be cooled with a transparent liquid flowing over its external face, but edge cooling is preferable since it obviates any undesirable optical and other effects which might be caused by liquid flowing over the surface of the faceplate or by the flow of air and the resultant precipitation of dust onto that surface. Furthermore, a phosphor screen on the internal surface of a sapphire faceplate may be aluminized as in a normal high voltage cathode ray tube so that ion damage to the phosphor is avoided by the use of the aluminum film. This eliminates the necessity for an ion trap and permits use of an axially symmetric gun. Because the phosphor can be bombarded from the side opposite that from which the useful light is emitted, the tube can be provided with conventional configuration greatly simplifying its construction. Resolution of such a tube will consequently be much better than that of an angled-neck tube or an internal-mirror tube.

DESCRIPTION OF THE PREFERRED EMBODIMENTS

Figure 1:
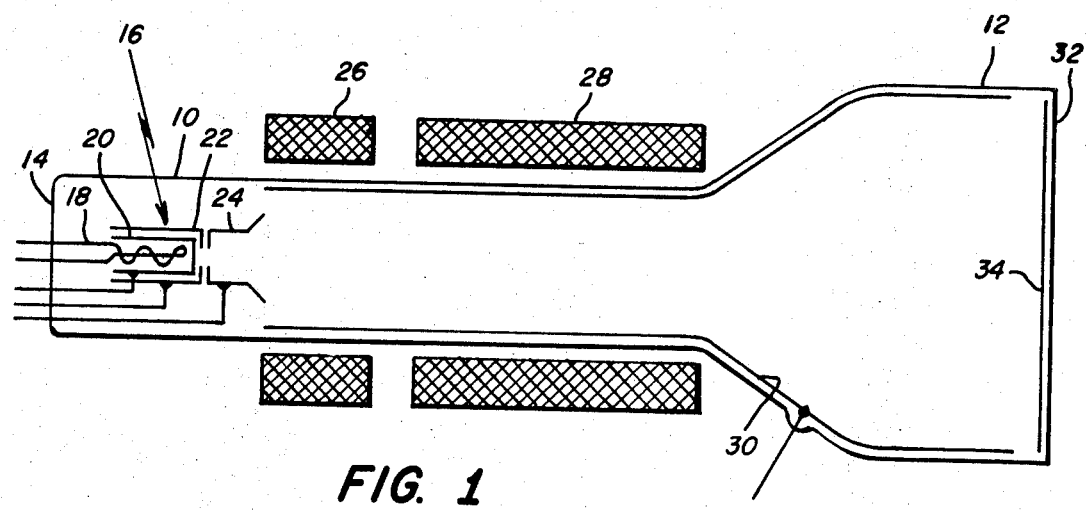
FIG. 1 is a diagrammatic view of a kinescope type cathode ray tube embodying the invention.

Referring more particularly to the drawings wherein like characters of reference designate like parts throughout the views, there is illustrated in FIG. 1 one type of cathode ray tube with which the invention may be suitably employed. The illustrated tube includes an elongated vacuum envelope having a cylindrical neck portion 10 and an enlarged section or bulb 12 at one end thereof. The opposite end of the neck 10 is closed as at 14 and supports an electron gun 16. Gun 16 employs a filamentary heater 18 having leads extending through the base 14 for connection to a suitable source of heater current. The heater 18 functions, when operated, to heat a cathode 20 to the point of emission of electrons therefrom. The cathode is provided on its end surface with a supply of electron emissive material for this purpose. Associated with the cathode are first and second apertured grids 22 and 24 for controlling the flow of a beam of electrons from the cathode, in the normal operation of a tube of this type. The electron beam is directed from the electron gun in a direction longitudinally of the tube toward the opposite end thereof and, in doing so, comes under the influence of focusing and deflection coils 26 and 28 respectively. The various elements of the gun are suitably connected to an external circuit in the usual manner of a tube of this character. It will be understood that the reflection coil may be replaced by internal deflection plates if desired, as is well known. An additional electrode in the form of a coating 30 is provided on the internal surface of neck portion 10 and bulb portion 12 for suitably directing the electron beam onto a faceplate structure 32 which closes the bulb end of the tube, and more specifically onto a phosphor layer 34 on the internal surface thereof.

Conventional application of electrical signals to the gun for creation of an electron beam and for causing the resultant electron beam to scan the inner surface of the phosphor layer 34 are utilized in the tube. Accordingly, since such technique does not constitute a part of this invention, additional details are omitted herein.

Figure 2:
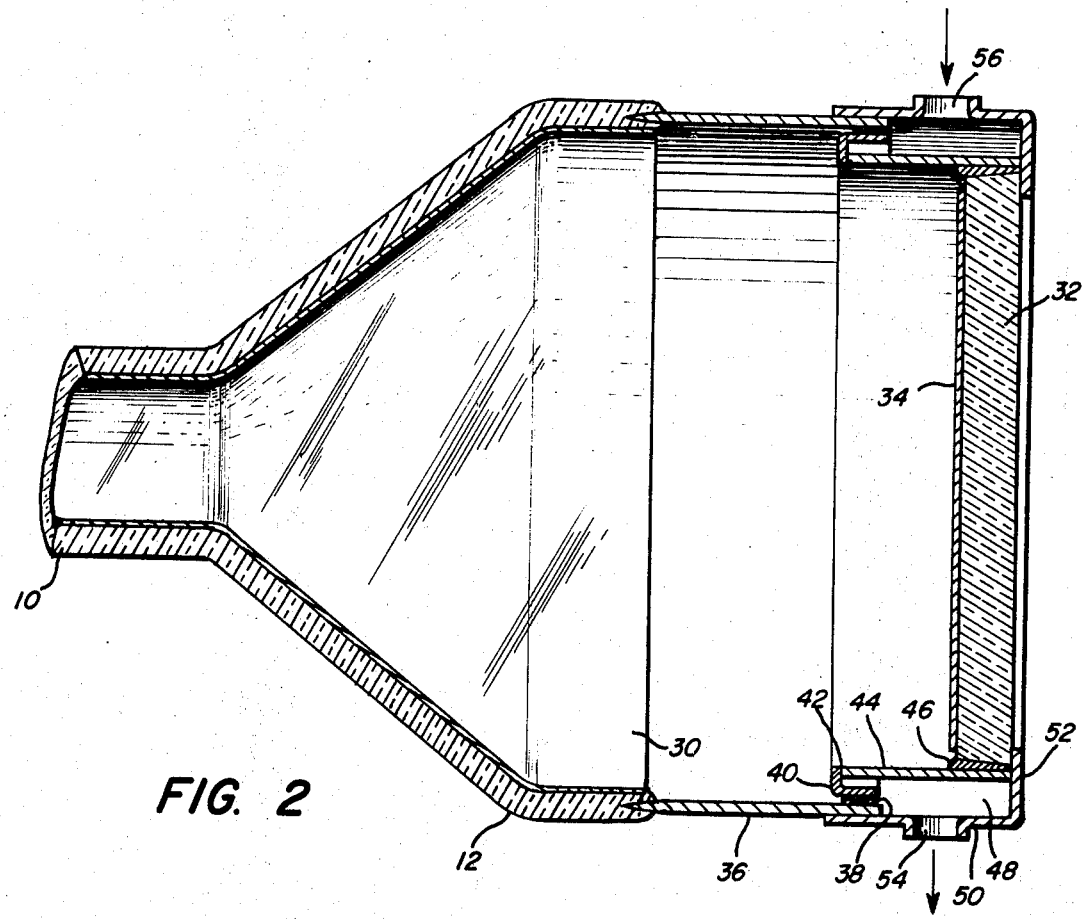
FIG. 2 is an enlarged axial sectional view of the target end portion of a cathode ray tube embodying a preferred form of the invention.

The faceplate 32 of the tube and its supporting structure are shown more clearly in FIG. 2 wherein it will be seen that faceplate 32 is optically transparent. Sapphire is utilized as the material of the faceplate 32 because of its optical transparency and its high thermal conductivity characteristics which make it particularly suitable for this invention. The phosphor layer 34 may be of conventional type and is disposed in a substantially uniform manner on the inner surface of the sapphire faceplate 32, as shown. The faceplate 32 is mounted on the open adjacent end of the glass bulb 12 by means of an intermediate metal ring or collar 36 which may be formed of chromium-iron-nickel alloy. Such a material has thermal expansion characteristics closely approximating that of glass which make it suitable for bonding to glass. One end of ring 36 is sealed to the end of bulb 12 throughout its periphery, and the other end thereof is sealed as by a weld 38 to an inwardly flanged ring 40 of a nickel-chromium alloy such as, for example, that known as Inconel, manufactured by International Nickel Company. The inwardly directed flange portion of ring 40 is sealed as by a weld 42 to one end of a metal collar 44 also formed of nickel-chromium alloy. The opposite end portion of collar 44 is adapted to closely embrace the peripheral edge of the sapphire plate 32 and is bonded thereto as by silver solder 46. In order to insure an efficient vacuum type seal between the sapphire faceplate 32 and collar 44, the edge of the plate 32 is preferably provided with a slight inward bevel as shown in exaggerated form in FIG. 2, whereby the faceplate may be inserted into the end of the collar and then firmly wedged therein and sealed thereto in an efficient manner.

As pointed out hereinbefore, sapphire possesses extremely high thermal conductivity and thus is well suited for use as a faceplate in a tube of this type. Heat is conducted inherently in a very efficient manner from any point on or in the body of the faceplate to the exterior thereof. Thus, high intensity bombardment by the electron beam of the phosphor layer 34 does not create the saturation problems which are inherent in prior are cathode ray tubes of this type since the heat built up in the bombarded area of the phosphor will instantaneously be conducted by the sapphire material to the exterior of the tube.

In order to efficiently achieve such heat dissipation, there is provided, as a preferred cooling means in further accordance with this invention, a cooling duct 48 which extends around the entire periphery of the faceplate 32. The duct 48 is a channel which is formed by ring 40 and collar 44 together with an outer ring 50 which is sealed at one end as by welding to the forward end of ring 36 and which has a flanged portion 52 which slightly overlies the front peripheral edge of the faceplate 32 and is bonded, as by welding, to the adjacent end of collar 44, as shown. Diametrically opposed openings 54 and 56 are provided in ring 50 for entrance and exit of a fluid coolant such as a dielectric oil or other selected fluid material. Thus, heat created by the phosphor bombardment is rapidly dissipated through the sapphire faceplate 32 to the fluid coolant and thus the tube may be made to operate more efficiently under high intensity electron bombardment.

It will be apparent that various modifications and changes may be made in the structure and operation of the tube described. For example, cooling fluid, such as air, may be directed over the external surface of the faceplate 32 rather than applied to the edge thereof, and for this purpose suitably transparent means may be utilized adjacent and in spaced relation with the faceplate for controlling the flow of such fluid. However, in order to achieve minimum size in a system embodying a tube of this character, an optical system (not shown) will usually be located so close to the faceplate as to render such surface cooling means impractical.

It is to be further understood that other changes may be made in the method of cooling the faceplate and, consequently, the phosphor thereon, such as by thermoelectric techniques, for example. These and other changes may be made by those skilled in the art without departing from the spirit of the invention as expressed in the accompanying claims.

I claim:
1. A cathode ray tube comprising an evacuated envelope having a target at one end and having an electron gun in the other end for generating and directing a stream of electrons toward said target, a faceplate structure closing the target end of the envelope and comprising a disc of optically transparent material having thermal conductivity higher than glass, said target comprising a layer of material which produces optical radiation through said disc when bombarded by electrons from said gun, and means for dissipating heat from said disc, said faceplate structure further comprising a supporting structure including a first metal collar closely embracing and hermetically sealed to the periphery of said disc, a second metal collar having thermal expansion characteristics similar to the material of the envelope and sealed at one end to the end of the envelope, and a metal ring sealed between and connecting adjacent ends of the first and second collars, and said heat-dissipating means comprising a metal annulus sealed at one end to said supporting structure and located in spaced relation to said first collar and having a flange at its opposite end which overlies and is sealed to the outer end of said first collar, the space between said annulus and first collar being a duct extending around at least a major portion of the periphery of the disc, and means for directing a flow of fluid coolant through said duct.

2. A cathode ray tube as set forth in claim 1 wherein said disc is sapphire.

References Cited

UNITED STATES PATENTS

| | | | |
|---|---|---|---|
| 2,237,065 | 4/1941 | Van Den Bosch | 313—44 X |
| 2,515,945 | 7/1950 | Binneweg | 313—21 X |
| 2,773,246 | 12/1956 | Brook | 315—39 X |
| 3,426,230 | 2/1969 | Webb | 313—44 |

JAMES W. LAWRENCE, Primary Examiner

V. LAFRANCHI, Assistant Examiner

U.S. Cl. X.R.

313—92